United States Patent
Phelps et al.

(10) Patent No.: US 6,223,864 B1
(45) Date of Patent: May 1, 2001

(54) FOOT PRESSURE ACTIVATED BRAKING WEDGE, SHOPPING CART WHEEL RESTRAINT

(76) Inventors: Margaret Phelps, 393 Meadowlark Ct.; Michael Steven Hargett, 839 Wavely Dr. SE., both of Albany, OR (US) 97321

( * ) Notice: Subject to any disclaimer, the term of this patent is extended or adjusted under 35 U.S.C. 154(b) by 0 days.

(21) Appl. No.: 09/307,971

(22) Filed: May 7, 1999

(51) Int. Cl.$^7$ ...................................................... B62B 5/04
(52) U.S. Cl. ........................... 188/19; 188/1.12; 16/35 R
(58) Field of Search .................. 188/19, 20, 29, 188/31, 69, 1.12, 265; 16/35 R, 18 R; 280/651, 652, 658

(56) References Cited

U.S. PATENT DOCUMENTS

| | | | |
|---|---|---|---|
| 2,738,034 | * | 3/1956 | Levine ...................................... 188/19 |
| 2,905,275 | * | 9/1959 | Kostolecki et al. ............. 188/1.12 X |
| 3,881,216 | * | 5/1975 | Fontana ........................... 188/1.12 X |
| 5,012,550 | * | 5/1991 | Schlosser ......................... 188/1.12 X |
| 5,288,089 | * | 2/1994 | Bowers et al. ...................... 188/19 X |
| 5,328,000 | * | 7/1994 | Rutter et al. ........................ 188/19 X |
| 5,390,942 | * | 2/1995 | Schuster et al. .................... 188/19 X |
| 5,456,336 | * | 10/1995 | Bopp ........................................ 188/17 |

\* cited by examiner

*Primary Examiner*—Douglas C. Butler
*Assistant Examiner*—Pamela J. Rodriguez

(57) ABSTRACT

A shopping cart is generally a wire framed cage made of a specific gauge of metal that is mounted on four wheels. This invention deals with the use of a braking system to keep shopping carts from rolling away, for example: when a customer pushing their goods in a shopping cart stops on an incline to unload their goods into a vehicle the shopping cart must be held or propped against an object to restrict its movement or otherwise the cart will roll down the hill.

This system will stop the shopping cart when the foot activated braking wedge is pressed into the wheel housing, by using the sole part of the shoe. The wheel will not move unless the braking wedge is released from its locking position by pulling upward on the braking wedge extension bar with the toe part of the shoe.

This wedge is true to its shape and is applied to the wheel to stop the rotation of the wheel. The wedge takes up the space between the top of the wheel and the bottom of the housing, thus impeding the rotation of the wheel.

1 Claim, 3 Drawing Sheets

FOOT PRESSURE ACTIVATED BRAKING WEDGE, SHOPPING CART WHEEL RESTRAINT

DESCRIPTION OF PRIOR ART

To detour damage done by shopping carts a device has been incorporated that locks the wheel at the bottom of the leg of the frame of the cart. Previous wheel braking devices have been developed for stopping the movement of the shopping cart or other equipment carts. In this case only one wheel is needed to immobilize the entire cart.

U.S. Pat. Nos. 2,905,275 and 5,012,550 disclose the use of a braking device to lock the cart wheel into a position thus not allowing movement of the wheel. U.S. Pat. No. 2,905,275 uses a U shape brake shoe to engage the wheel mechanism, which has to be applied by foot on one pedal and the other pedal is released. U.S. Pat. No. 5,012,550 uses an L shape, horizontal, two-arm lever that has to be depressed to move.

BACKGROUND OF INVENTION

Damage to personal property and persons occur each year from runaway shopping carts. Such damage is caused to automobiles, children left in shopping carts, and real property when the shopping cart strikes the object from lack of a braking system. This problem can be over come by introducing a braking wedge.

Generally, this braking wedge is assembled to use on a shopping cart having a frame, a basket mounted on the frame, front and rear wheels supporting the frame, which includes handles for pushing and guiding the cart from one place to another by the wheels, but can also be used on other wheeled equipment carts. This wedge can be sized to fit new and existing carts by the placement in a fixed position on a single wheel on the leg of the frame of the cart to immobilize the entire cart.

This present invention relates to a braking wedge constructed with only one moving part, is easily attached and is economical for shopping carts and other wheeled equipment carts. The means of holding the wheel in one position in response to the application of the insertion of the wedge into the wheel housing can detour accidents.

FIELD OF INVENTION

This invention relates to a braking system that stops shopping carts from rolling away on un-level ground.

SUMMARY OF INVENTION

The braking system consists of a braking wedge, with an extension bar, that when pressed into the wheel housing, it will set the wedge and restrain the shopping cart wheel from any movement.

To release the shopping cart wheel for movement the braking wedge extension bar is pulled upward with the shoe.

PREFERRED EMBODIMENT

A shopping cart is used for retail and wholesale business. Runaway shopping carts cause considerable damage each year to vehicles, persons, and property. By placing a braking system on the rear wheel of the shopping cart this problem will be eliminated. This braking system consists of a wedge that impedes the motion of the wheel by a foot operated braking wedge.

This braking system which is easily adapted to existing shopping carts can be installed with simple instructions to convert present shopping carts that are not equipped with a braking system. Also, manufacturers of such carts can inexpensively produce the braking systems and incorporate the system during the production and assembly of the carts.

Therefore, due to the need of a braking system and the cost effectiveness of installation of the now existing shopping carts and the manufacturing of new ones this invention fulfills the need of both retailers and manufacturers.

Ultimately, the consumer will feel that when their infants and small children are placed in the seating part of the shopping cart the braking system can be activated for safety and convenience. This will give a more secure feeling to the shopper. Not only will this invention help prevent personal injury but in addition it will also decrease the number of property accidents, such as automobiles, buildings, etc. which will cost less in damage claims.

Figure 1:
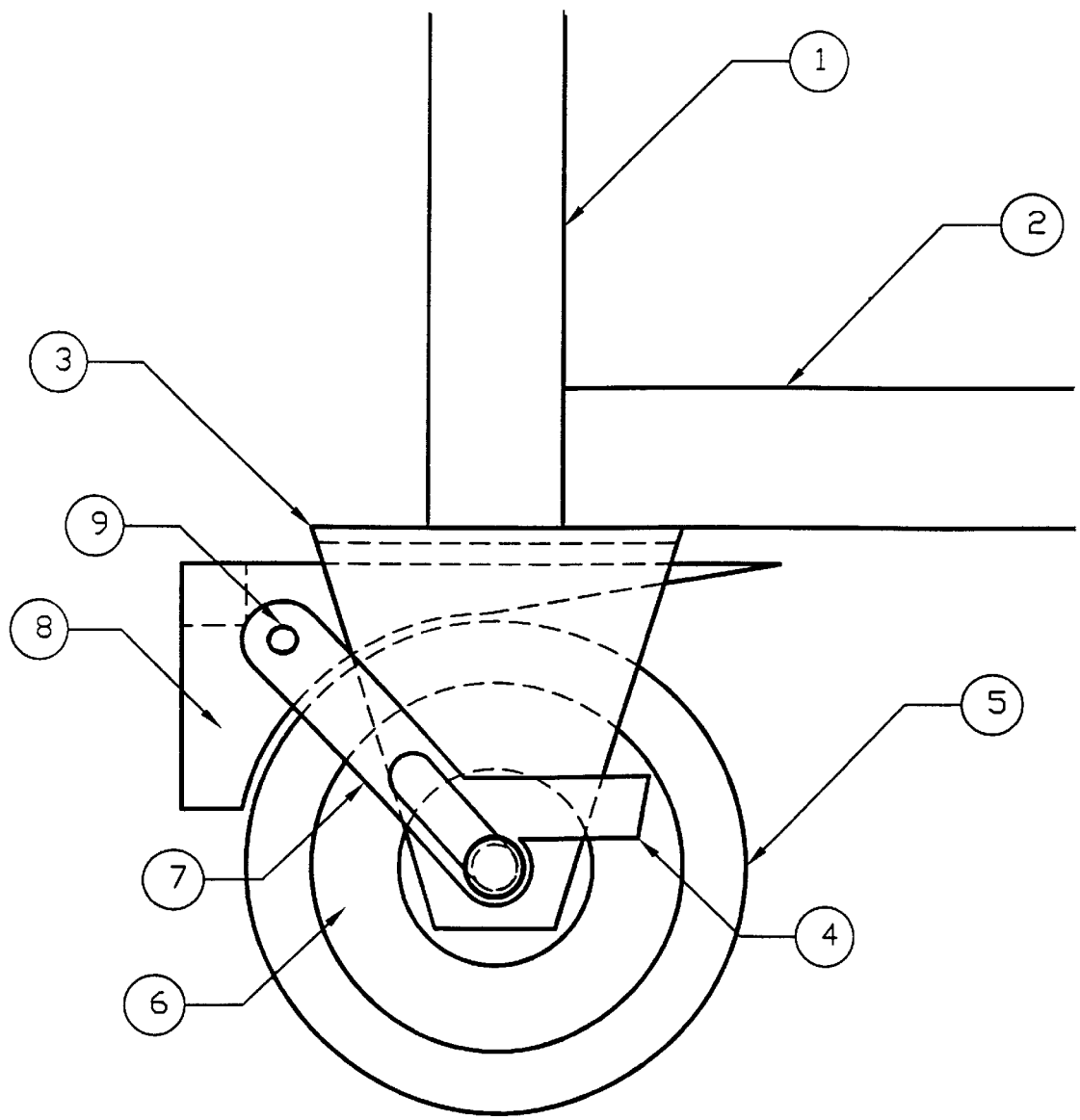
FIG. 1 is a side view of a braking wedge and wheel assembly of this invention attached to a shopping cart frame.
Figure 2:
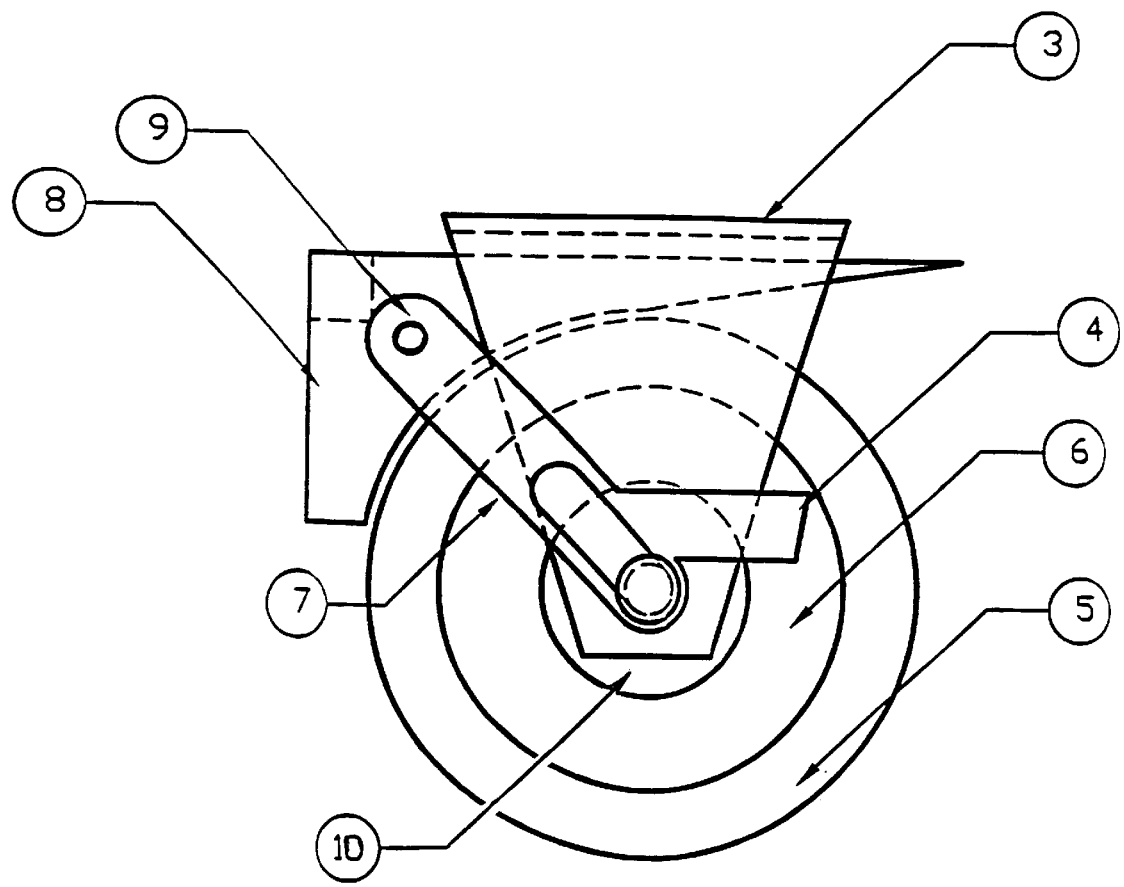
FIG. 2 is the braking wedge and wheel assembly with the shopping cart frame removed.
Figure 3:
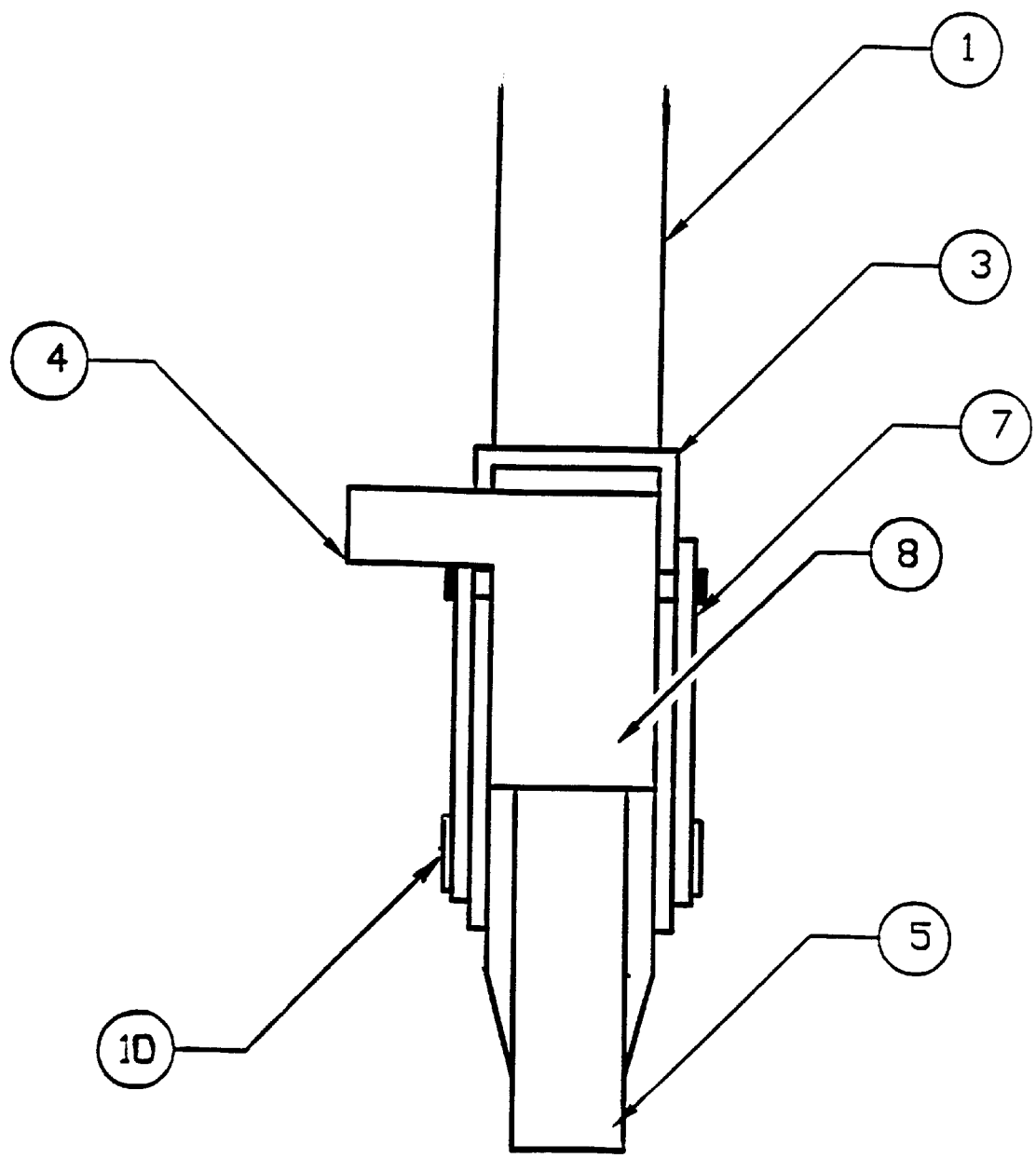
FIG. 3 shows a rear view of the braking wedge assembly.

The braking wedge of this invention is illustrated more clearly in FIGS. 1–3.

As shown in FIG. 1, a braking wedge 8 is illustrated for use on a shopping cart having a vertical frame 1 and a horizontal frame 2 and carrying a wheel 5 and a wheel housing 3. However, the braking wedge can be used on other types of wheel assemblies, not limited to just shopping carts. The braking wedge 8 is to be located within wheel housing 3 upon force being applied to the braking wedge, for example, by the sole of the cart operator's foot. Sliding bracket 7 functions as an extension used to insert braking wedge 8 into wheel housing 3 to stop wheel 5 from rotating.

The operation of the braking wedge is as follows: Hub and axle bolt assembly 10 located on the metal portion 6 of the rubber wheel 5 allows the wedge assembly 8 to pivot via sliding bracket 7 when the cart operator uses the sole of his/her foot or some other means to press wedge 8 into wheel housing 3. The braking wedge 8 is used to eliminate the displacement between the cart wheel 5 and the wheel housing 3. The wedge 8 restrains the wheel 5 from rotating by its location between the top of the wheel and the bottom of the wheel housing, thereby taking up the space between the two parts to impede the rotation of the wheel. The wheel will not move unless the braking wedge is released from its locking position by pulling upward on the braking wedge extension bar 4, for example, with the toe part of the operator's shoe. This pivoting action inserts or releases the wedge 8 from the wheel housing 3, either restraining the wheel or freeing the wheel for rotation. Braking wedge extension bar 4 forms part of sliding bracket 7 and thus, can come to rest against the shopping cart wheel housing 3 when the braking wedge 8 has been released from the restraint position. This will allow the braking wedge 8 to only fall back to a certain angle after it has been taken out of the wheel housing 3.

Connection pin 9 runs through the braking wedge 8 to the inside of the cart to another sliding bracket on the opposite side of the wheel 5, not shown.

FIG. 2 shows the braking wedge and wheel assembly with the shopping cart frame removed.

FIG. 3 shows the rear view of the braking wedge assembly. The horizontal lines on the wedge 8 indicate ridges to keep the foot from slipping off the wedge when the wedge is being pressed into the housing to restrain the wheel.

What is claimed is:

1. A braking wedge and wheel assembly for restraining a wheel against rotation comprising: a sliding bracket pivotably attached to a hub and axle assembly of the wheel, a wedging member connected to the sliding bracket for filling a space created between the top portion of the wheel and a bottom portion of a wheel housing, and an extension bar connected to the sliding bracket, wherein the wedging member is moved into a wheel restraint position by rotating the wedge into a contact position with the wheel housing and the wheel, wherein the wedging member is unlocked from its contact position within the wheel housing by pulling upward on the extension bar to enable free rotation of the wheel, and wherein the extension bar also acts to limit the movement of the wedge in the unlocked position.

* * * * *